(12) United States Patent
Fukuda

(10) Patent No.: US 6,643,341 B1
(45) Date of Patent: Nov. 4, 2003

(54) VOICE AND IMAGE SIGNAL TRANSMISSION METHOD USING CODE OUTPUT

(75) Inventor: Hirosi Fukuda, 201-Go, Saniihiru (A Too), 1175-1, Higashi Arai, Tokorozawa-Shi, Saitama-Ken, 359-0034 (JP)

(73) Assignee: Hirosi Fukuda, Saitama-ken (JP)

(*) Notice: Subject to any disclaimer, the term of this patent is extended or adjusted under 35 U.S.C. 154(b) by 0 days.

(21) Appl. No.: 09/367,305

(22) PCT Filed: Feb. 4, 1998

(86) PCT No.: PCT/JP98/00468

§ 371 (c)(1),
(2), (4) Date: Oct. 22, 1999

(87) PCT Pub. No.: WO98/36544

PCT Pub. Date: Aug. 20, 1998

(30) Foreign Application Priority Data

Feb. 12, 1997 (JP) ............................................. 9-063696

(51) Int. Cl.$^7$ ................................................. H04B 1/76
(52) U.S. Cl. ....................... 375/358; 375/240; 375/343; 375/346; 375/349; 375/356; 375/366; 375/368; 370/521; 704/503
(58) Field of Search ................................. 375/147, 148, 375/149, 135, 136, 137, 142, 144, 259, 260, 286, 287, 288, 289, 293, 295, 296, 316, 339, 340, 346, 349, 354, 356, 150, 165, 166, 168, 240, 358, 343; 370/521; 704/503

(56) References Cited

U.S. PATENT DOCUMENTS

| | | | | |
|---|---|---|---|---|
| 4,106,007 A | * | 8/1978 | Johnston et al. ............ 178/67.1 |
| 5,383,164 A | * | 1/1995 | Sejnowski et al. ........... 367/134 |
| 5,774,837 A | * | 6/1998 | Yeldener et al. ............. 704/206 |
| 6,236,862 B1 | * | 5/2001 | Erten et al. .................. 370/342 |
| 6,381,277 B1 | * | 4/2002 | Chun et al. ............. 375/240.12 |

FOREIGN PATENT DOCUMENTS

| | | |
|---|---|---|
| JP | 56-161743 | 12/1981 |
| JP | 57-136845 | 8/1982 |
| JP | 62-48154 | 3/1987 |
| JP | 63-122335 | 5/1988 |
| JP | 1-39854 | 2/1989 |
| JP | 2-79595 | 3/1990 |
| JP | 2-218243 | 8/1990 |
| JP | 6-22372 | 1/1994 |
| JP | 7-131495 | 5/1995 |

* cited by examiner

Primary Examiner—Tesfaldet Bocure
(74) Attorney, Agent, or Firm—Taiyo, Nakajima & Kato

(57) ABSTRACT

A method employing multisignal encoded start pulses and end pulses for data transmission by use of radio waves, carries out encoding so that a very large number of kinds of patterns (not less than $10^{14}$ kinds are possible) can be effected with one frequency. In the binary system, encoding needs a large number of signal pulses and high frequency, and the frequency of the carrier wave becomes very high also. The multisignal method of this invention makes it possible to reduce the encoding bits and the carrier wave frequency by using level sensing and width comparison techniques. This method also removes noise owing to its level sensing and width comparison techniques which have not been used in conventional digital communication systems. Therefore, the reception of erroneous information, the occurrence of unclear audio-visual images, and noise trouble are prevented in the use of radio waves.

1 Claim, 3 Drawing Sheets

VOICE AND IMAGE SIGNAL TRANSMISSION METHOD USING CODE OUTPUT

TECHNOLOGICAL FIELD

The present invention relates to the special method of sound-image signal transmission on a radio wave.

The basic idea of this invention is to use multisignal codes and send them via radio wave, and to employ sensing levels with different thresholds to sense, record, and recognize each of the codes on the receiver's side.

The related field of technology includes the method of encoding, combining the code signals with information signals, and using encoded start and end pulses.

Available frequencies for signal carrier waves are severely limited at present. For example, in the 100 MHz range, current technology can barely follow up only to the third decimal. The demand for available frequencies is extremely heavy and they can not be allocated. So, frequencies must be registered with the Radio Frequency Administration Bureau of the Ministry of Posts and Telecommunications to be used. The reasoning is protection against interference.

Originally signals belonged to anyone and everyone. This invention intends to provide a new, technologically stable method that makes restricted frequencies available to many people for many matters, and hereafter enables people to control their signals themselves and to take responsibility for their own signals.

The principle of this invention can be applied not only to radio-wave, but also to optical, sound-wave, and magnetic transmissions.

BACKGROUND TECHNOLOGY

According to traditional design, only 0.1% of available frequencies are licensed for use. An exceedingly scarce supply and no way equal to the demand. Therefore, the Radio Frequency Regulations allows only a weak output level. This, in turn, makes a kind of interference in itself. As current technology cannot eliminate it, the demand remains unsatisfied.

In addition, noise interference from an automobile, etc., during the transmission and the reception has become serious.

Moreover, the digital encoding system now employed is the binary notation, which makes the number of bits for a code very large. As a single signal requires several cycles of a carrier wave in order to be transmitted, the effective carrier-signal ratio is now reaching something between 100 to 1000 times. For example, a data signal at 10 MHz effectively becomes a 10 KHz signal. This intensifies a tendency to seek high frequencies.

Further, the longer the data becomes represented in the binary notation, the longer it takes to transmit the data.

As mentioned above, problems of limited frequencies, noise, and problems associated with the binary notation combine together into a very large problem. The invention described herein regards the lack of a system for reduced bit signal pulses as a problem.

Also, other types of interference in addition to traditional problems, such as hackers, limit available frequencies further. There are then restrictions and regulations created to avoid the occurrence of such trouble.

New methods for wireless and high-speed business communications are continually sought. Installation of personal computers by individual companies for specific single uses (e.g. for production figures only) is just one indication. With these computers, they are exchanging information such as the instructions for collection or delivery of goods, production data, etc. This makes large memory storage necessary.

Cabled communications, whether telephone or the Internet, are susceptible to the problems of hackers, interference, and necessity of large memory storage. Systems up until now still pick up noise such as television signals very easily.

These are the main problems in today's communications.

DISCLOSURE OF INVENTION

This invention views 1 (one) not as the signal that constitutes the binary notation, but as one of various multisignals. If we put one of such multisignals at the position which now 1 occupies, the precious limited space can be used wide. The memory for this purpose has successfully been developed.

Addressing the problem of limited frequencies, this invention uses a special system of multisignals, making roughly $10^{14}$ patterns possible in a single signal wave, and this can be attained even by a weak wave.

This approximate $10^{14}$ is necessary for today's population needs and diversity of uses. This $10^{14}$ is expressed, for example, in 49 bits in the binary notation, while in 22 bits in the general multisignal system with 4 signals. But the general multisignal system cannot prepare so many signals which can be clearly discriminated from each other. On the other hand, as the multisignal system of this invention can provide a large number of multisignals, $10^{14}$ can be expressed, for example, in 14 bits with 9 signals, and in 12 bits with 19 signals. The multisignal system of this invention can reduce the number of the necessary bits extremely. This fact is important.

As for noise problems, this invention employs the multisignal system with voltage level sensing. Any signal sensed below the determined level is not picked up, and even if it should be picked up, width sensing eliminates noise which is processing. This system does not sense other types of signals, owing to recording and comparison of input/output.

Overcoming those various problems which we have encountered, by using the multicode method based on the multisignal system, carrier-signal ratio can be improved to 50 times or so.

The purpose of this invention is to solve the above-mentioned various problems.

This invention uses repetitious signal checks. Prior to each transmission of a block of information signals, particular code signals composed of such multisignals as mentioned above are checked repeatedly.

As the transmission of particular information data corresponds to particular code signals, and the latter are checked prior to the transmission, other code signals can be used as prior checks of transmissions of different data. Thus a single frequency can be put to diverse usage.

Owing to the multisignal system, the number of bits for code signals and information signals can be made very small. Thus sending them in a high frequency brings about a high-speed transmission.

A noise below a certain voltage level are simply not sensed. The level and the width of the code signals are sensed and recorded, and only if the transmitted code signals are identical to the record, the accompanying information signals can be output. There is no room for noise interference, which makes data transmission safer.

Toward this purpose, employ the necessary number of multisignals, arrange a particular multisignal system by first applying this invention, and transmit the signals using multi-codes of this invention. Thus prevent specific problems or difficulties which each particular transmission may encounter.

First, the sender's side sends several times code-packed multisignals and information signals. Then, the receiver's side sends back a code for acknowledgement. It may be a general practice (though this remark is not directly related to the present invention) to send the information signals in blocks through time-division multiplex system together with the code signals, and to convert the information signals into ordinary readable signals on the receiver's side.

DESCRIPTION OF PREFERRED EMBODIMENT

Actual transmission using a set of transmission devices, as an application of this invention, is carried out as follows. Refer to the drawings.

Figure 1:
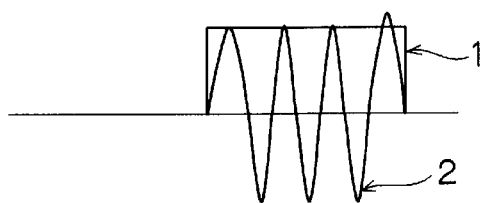
FIG. 1 shows the relation between a single pulse in the conventional binary system and in the multisignal system of this invention and a carrier wave.
Figure 2A:
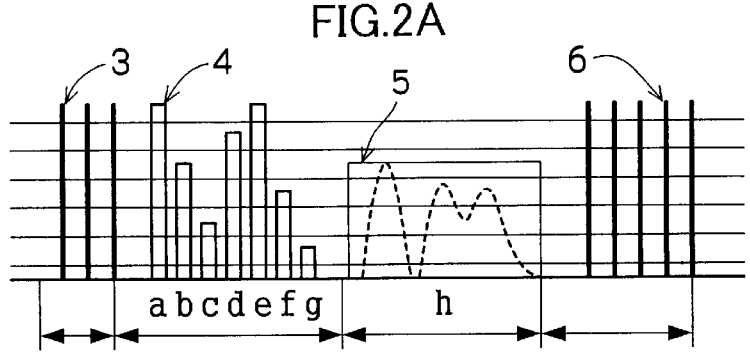
FIG. 2 is a series of illustrations which relate to the claim of this invention.
 (a) A set of encoded start signals, code signals, information signals, and encoded end signals produced by a sending device.
 (b) The relation between received codes and sensing levels at a receiving device (the start and the end signals are omitted here).
 (c) The signals in (b) as sensed by each level
 (d) Information signals expressed in one pulse
Figure 2B:
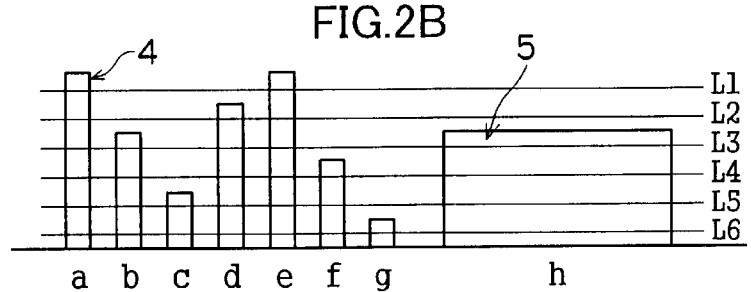
Figure 2C:
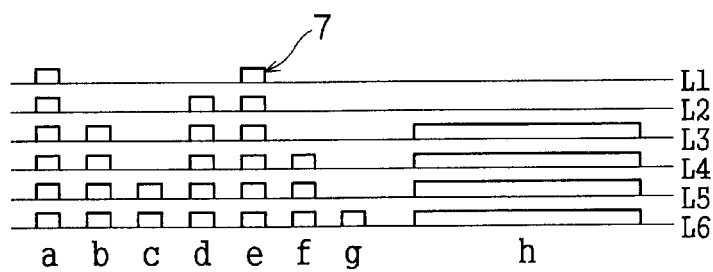
Figure 2D:
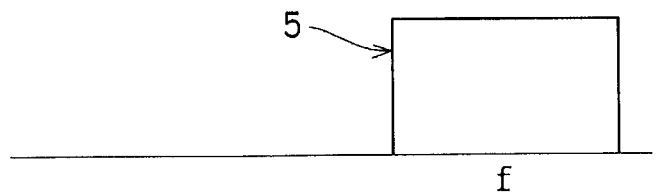
Figure 3A:
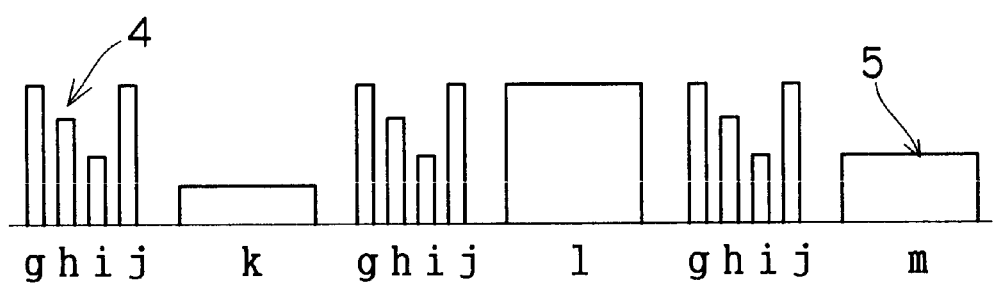
FIG. 3 shows the relation between repeated code signals and information signals, as described in the claim of this invention. The start and the end signals are omitted here.
 (a) Repeated code signals and information signals produced by the sending device.
 (b) Repeated code signals and information signals received by the receiving device.
 (c) Separated information signals
 (d) Original information signals FIG. 4 are examples of circuit block diagrams of the transmission devices of the invention.
 (a) A block diagram of a sending device
 (b) A block diagram of a receiving device.
Figure 3B:
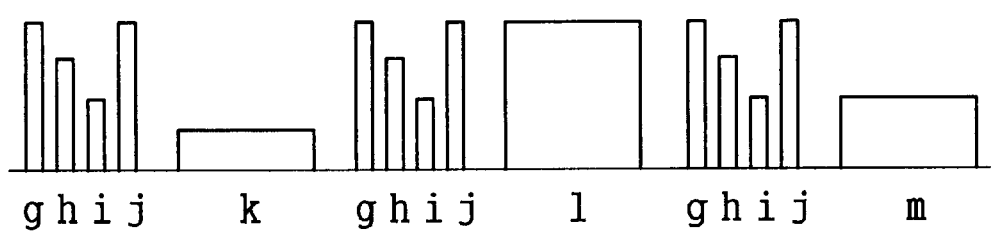
Figure 3C:
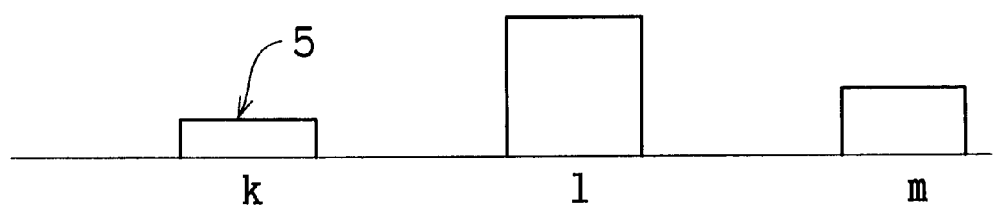
Figure 3D:
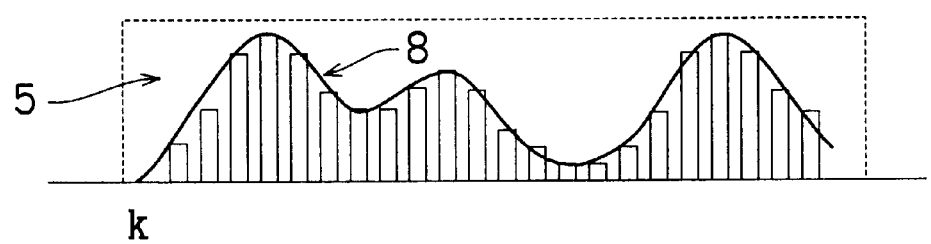

FIG. 1 shows a carrier wave 2 forming a code pulse which represents 1 (one). This is a common practice in the conventional binary system. On the other hand, the multisignal system uses each one of the signals forming a code pulse for 1 as an independent signal. If, for example, the signals are expressed by their levels, and the levels are multiplied by each other, number of bits to represent a numeral is reduced extremely.

The carrier wave of this invention needs fewer bits than in the binary system. So if the transmission by this invention is allowed to spend the same time as is spent by the binary system, the frequency of the carrier wave need not be so high. Thus the carrier-signal ratio gets small in this invention. This enables the signal wave to have a higher frequency.

Information signals which follow the code signals are omitted here.

FIG. 2 explains a set of signal blocks relating to claim 1 of this invention.
 (a) shows signals transmitted by the sending device. First a code block composed of seven bits of multisignals, then an information block, here expressed in one pulse for simplification, have been sent.
 The code block is seven bits of pulses with the peak levels L1, L3, L5, L2, L1, L4, and L6. However, changing the peak level is not the only way to get a special multisignal pulse; changes of width, duty, frequency, waveform, etc. also suffice.
 These signals have been sent via radio wave.
 (b) expresses the received signals at the receiving device. The start signals and the end signals, though received, are not drawn here. Here is shown the regenerated code block. This code is stored in the receiving device, and when the next code is transmitted, it is compared with the-stored one to recognize it.
 The level of the start pulses sent from the sending device indicates the standard output level of an auto gain control circuit. The code is shown as a, b, c, d, e, f, and g.
 (c) illustrates the received code signals sensed as pulses at each level from L1 to L6. These are stored first, then compared with the next received signals. If they are recognized to be the same, only then the information signals are output.
 (d) is a block of the information signals expressed here in one pulse.

In FIG. 3, "the encoded start signals" and "the encoded end signals" in the claim of this invention are omitted here. Here several such sets of signals as described in claim 1, each having a different information block, are prepared to cope with changing information.
 (a) shows serial sets of a code block and an information block which have been sent out continuously from the sending device. The code signals are repeated before every block of the information signals. Signals which represent ever-changing information are divided into blocks.
 (b) shows the serial sets of signals received by the receiving device. The device catches the start signals which have been sent repeatedly from the sending device, and receives the code signals and information signals after they have been modified by an auto gain control. The start and the end signals are omitted in the drawing.
 (c) expresses the information signal blocks. The code signals are compared with the ones which have been level-sensed and stored previously. If they are recognized to be the same, they are erased, leaving only the information blocks.
 (d) illustrates an information signal block which has been transmitted. It is these signals shown here which make perfect sounds, etc.

Figure 4A:
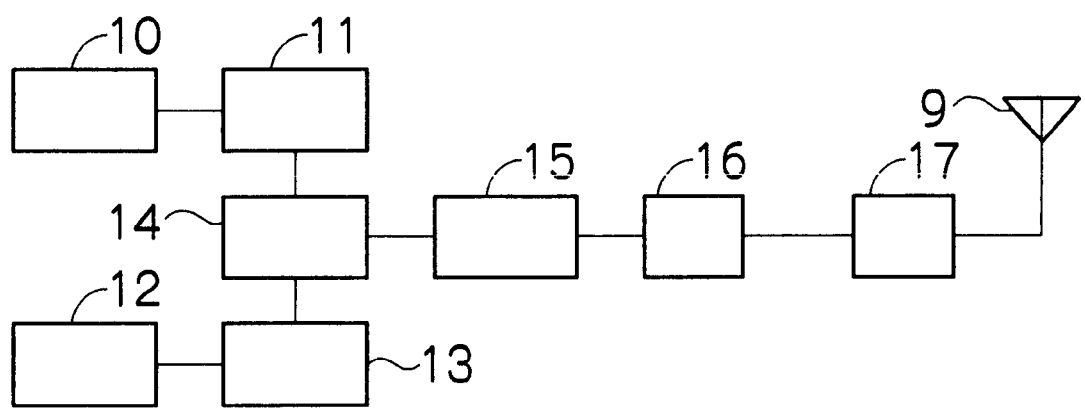
Figure 4B:
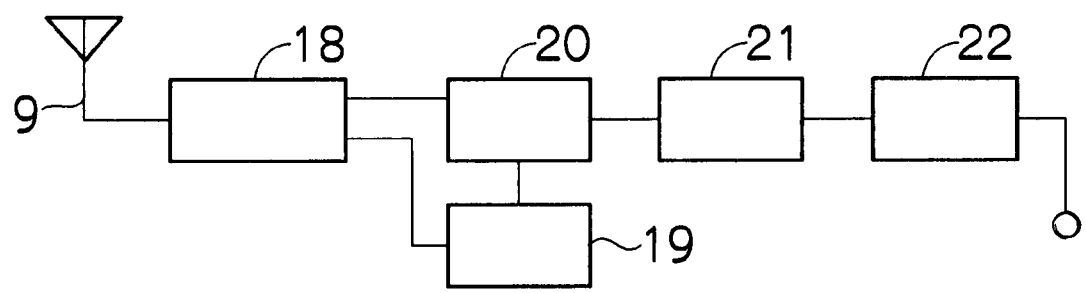

FIG. 4 are examples of circuit block diagrams of the transmission devices of the present invention.
 (a) is a diagram of circuit blocks of a sending device. An oscillation circuit 10 generates a carrier wave (frequency $f_1$) and sends it to a frequency modulation circuit 11, while a pulse oscillation circuit 12 generates a pulse wave (frequency $f_2$). The pulse wave is sent to a code/information output circuit 13 composed of a counter, ROM, etc. This circuit sends code signals 4 and information signals 5 which are composed of not only conventional pulses but also multisignals with various levels, widths, etc., to a frequency modulation circuit 14.

Through the frequency modulation circuit 14, the code signals and information signals are put on the carrier wave from the frequency modulation circuit 11. The frequency is then multipled at a frequency multiplication circuit 15 and is driven at a drive amplifier circuit 16. Its power, too, is amplified at a power amplifier circuit 17. And then the wave is sent out through an antenna 9.

However, the information signals 5 may be common ones, and are sent out after compression, using the time-division system and/or the multiplex system.

(b) is a diagram of circuit blocks of a receiving device. The carrier wave is received through an antenna 9. Only the necessary frequency is led to a bypass circuit. The voltage of the signal wave is fixed through an auto gain control (AGC) or a limiter 18.

The code signals 4 are recorded in a code memory circuit 19 which stores level-sensed signals. When the next code signals come and level-sensed, they are compared with the previously stored signals at a code discrimination circuit 20. If both codes are recognized to be identical, a code erasing circuit 21 erases the code signals. And only necessary information signals are taken out through an information signal output circuit 22. Then a reproducing circuit (omitted here) reproduces original information.

INDUSTRIAL APPLICABILITY

Results and effects from the use of this invention in the above explained method are as follows.

The code used in this invention is not based on the conventional binary notation, but on the special multisignal system (or multi-code method). So using the same number of bits, larger amount of data can be expressed, and encoding is made very easy. Many signals can be produced, by changing the voltage level for different height, the time for different width.

Noise effects are eliminated. As the frequencies are selected by the bypass circuit and the width, etc. of the code is compared with the memory, interference is avoided.

The code signals are erased, leaving only the information signals. These information signals, when sent on extremely high frequencies, become so close and fine that they are suitable for the transmission of sounds and images.

The code is checked by the levels, which eliminates checking errors caused by noise. Thus the door to a wide use is opened.

This invention allows greater uses of single frequencies, removing the need for stern regulations. Instead, the sender should take the responsibility for sending out a radio wave.

The industrial application of this invention includes: wireless radio, cellular telephones, pagers, positioning systems for aircraft and sea vessels, hospital-patient interactions, elevator monitoring systems, communications between automobiles and traffic controlling equipments, television-phones, mountain climbing communication gear, Internet, disaster communication systems, and many others can be thought of.

Usage in equipment that is not particularly for data transmission includes: crime prevention systems, measuring devices, controlling equipments, robotics, and so on.

What is claimed is:

1. A method of data signal transmission using multisignals in which: a plurality of sensing levels are prepared so as to sense and discriminate signals which are different in height, width, duty, frequency, and waveform; from all the signals recognizable by the above-mentioned levels, the necessary number of the signals are chosen at random for use as multisignals; a block of encoded signals composed of such multisignals and a block of information signals are compressed together in time direction to form multisignal code and sent out repeatedly; on the receiver's side, after the time-direction compressed wave is received and restored, the block of multisignal code is sensed and recorded with a plurality of the above-mentioned levels; when the next block of multisignal code comes, it is compared with the recorded one; only when the both blocks are recognized to be the same, the accompanying information signals are taken out; and simultaneously signals of acknowledgement are sent to the sender's side, the sender's side inserts, before compression, said block of encoded signals and said block of information signals between encoded start signals and encoded end signals; these signals are put together as a set, and such a set is compressed and sent out repeatedly one after another at irregular intervals; the transmission is continued until the sender receives a multisignal code from the receiver's side which tells that the receiver has received the sets of signals; the receiver, receiving the encoded start signals, recognizes and verifies the multisignal code block in every set of the multisignal code block and information block and the encoded end signals; the receiver sends to the sender a multisignal code to acknowledge his or her reception of the transmission, and keeps on sending the code repeatedly at irregular intervals until the transmission stops; and the information signals are taken out a single time.

\* \* \* \* \*